Nov. 15, 1927.
S. RUBEN
1,649,744
ELECTRIC CURRENT RECTIFIER
Filed March 5. 1925
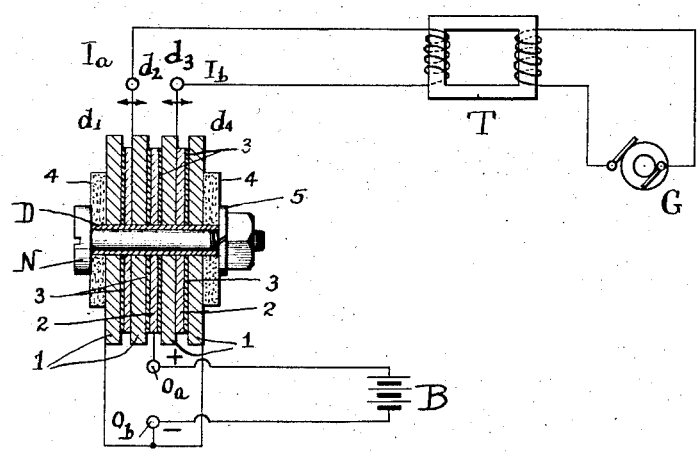
Inventor
SAMUEL RUBEN
By his Attorney Patented Nov. 15, 1927.

1,649,744

UNITED STATES PATENT OFFICE.

SAMUEL RUBEN, OF NEW YORK, N. Y., ASSIGNOR, BY MESNE ASSIGNMENTS, TO RUBEN RECTIFIER CORPORATION OF DELAWARE.

ELECTRIC-CURRENT RECTIFIER.

Application filed March 5, 1925. Serial No. 13,143.

This invention relates to electric current rectifiers and the like, and particularly to the dry surface-contact variety.

The object generally of the invention is to provide a device of the character indicated, which is efficient, economical and readily manufactured.

More specifically an object of the invention is to improve the character of the electrode elements which comprise the elemental asymmetric couples employed in devices of this character, particularly where oxide-coated electronegative electrode elements are used, which for certain services have desired characteristics. Such electronegative electrode elements, when properly combined with a suitable electropositive electrode element, will give substantially an optimum rectifying effect.

Other objects of the invention will in part be obvious and will in part appear hereinafter.

The invention accordingly comprises the features of construction, combinations of elements, and arrangement of parts, which will be exemplified in the constructions hereinafter set forth and the scope of the application of which will be indicated in the claims.

This application is a continuation in part of my prior applications, Serial No. 750,939, filed November 18, 1924, and Serial No. 754,956, filed December 10, 1924.

For a fuller understanding of the nature and objects of the invention reference should be had to the following detailed description taken in connection with the accompanying drawing, in which:

The figure shows, mainly diagrammatically, a rectifying device arranged in accordance with the present invention and adapted for battery-charging service.

In the practice of the present improvements, an elemental asymmetric electric couple is provided for rectifying devices in which the electronegative electrode element is a film-forming compound, preferably a metallic oxide compound, and the electropositive electrode element is selected and constructed to provide substantially an optimum of efficiency when in rectifying service.

It has been ascertained that a metal of the chromium group constitutes suitable material for the cooperating electropositive electrode element in such a couple, particularly if the metal be preliminarily coated with oxide.

The preferred method for producing such a coated element is by connecting the metal electrode as the anode in a direct current circuit at about 150 volts, and discharging a current thereto when it is immersed in a saturated solution of ammonium borate; another method for oxidizing the electrode surface is by heating the metal in an oxidizing atmosphere, but the film so formed is relatively less satisfactory than when made by the former method. The film coating of metal oxide acts as the current blocking factor when the electrode is connected as the anode in the alternating current circuit, but permits the flow of current through to the adjacent electrode when connected as the cathode, thereby effecting alternating current rectification.

For the electrode material substantially any of the metals of the chromium group may be used, for example, chromium, uranium, molybdenum and tungsten; and have found the highest current rectification was effected with tungsten. For the contracting oxide materials, manganese oxides, iron oxides, lead peroxide and various vanadium oxides may be used. Substantially the most efficient rectification is obtained when employing vanadium pentoxide, the most efficient combination being that oxide with tungsten, by which the output current density is high, the current and potential are constant and the electrical resistance of the unit is low. It has been also discovered that if to a plate of tungsten is applied a layer of vanadic pentoxide in powdered form and heated sufficiently to melt it so that it flows over the tungsten surface, the vanadium being an oxide, reacts with the tungsten, forming a surface film of tungsten oxide, which is the rectifying element in the combination. The fused vanadium coating is highly conductive, and the combination constitutes a highly efficient single wave rectifying unit. By treating both sides of the tungsten plate in this manner, double wave rectification is obtained.

While it appears that the highest rectification is obtained by a couple constructed as described, still current rectification may be obtained, that is satisfactory for certain purposes by applying the metallic oxide to to the oxidized surface of the metal electrode mixed with a chemically inert binder, and then burning out the undesirable components of the binder; also by forming a plate of the powdered metallic oxide and maintaining it in close surface contact with the oxide film coating of the metal electrode.

This couple is equally well adapted for other uses, such, for instance, as a high capacity condenser and as an automatic cut-off relay in a direct current circuit. A function of the contacting metallic oxide, besides being that of a connecting conducting member, is to effect a reforming of the surface film in the event that it is injured: upon the application of current the film-forming process immediately commences, thus restoring the rectifying properties of the unit.

Referring now to the drawing, G represents an alternating current generator, T a transformer and B the battery being charged. A series of oxide coated tungsten plates is represented by 2, in surface contact with film-forming material 3 which, in turn is in surface contact with conducting plates 1. The middle tungsten plate is coated with the tungsten oxide and in surface contact with the film-forming material on two sides, the other tungsten plates being in such contact and so coated on only one side each. Holding the various plates in contact under pressure is bolt N, insulated by tube D from the plates. At each end of the bolt N is an insulating washer 4, and at one end spring washer 5.

At $I_a$ and $I_b$ are the alternating current input leads and at $O_a$ and $O_b$ are the rectified output terminals. The positive pole of battery B is connected to the middle tungsten electrode 2, the negative pole being connected to the conductive plates 1. In operation, as the current is applied to the electrodes, current flows when the oxide coated tungsten plates are the cathodes, in a direction indicated by arrows $d_1$ and $d_4$; upon reversal of the polarity the current flows as indicated by arrows $d_2$ and $d_3$, thus allowing complete rectification, and the application of direct current to the output terminals $O_a$ and $O_b$. The battery receives a charge when the output direct current potential is greater than its own, the current flowing through the circuit. However, should this potential be reduced, the battery will not discharge in the opposite direction because of the practically open circuit resistance of the oxide coated tungsten electrode, when connected as the anode.

Having described my invention, what I claim as new and desire to secure by Letters Patent is:—

1. In dry surface contact rectifying devices and the like, the combination, with an electronegative electrode element comprising a metallic oxide, of an electropositive electrode element comprising a metallic element of the chromium group; said electrode elements being operatively disposed in adjacent relation so as to provide a relatively permanent asymmetric conducting film.

2. In dry surface contact rectifying devices and the like, the combination, with an electronegative electrode element comprising a metallic oxide adapted to yield oxygenions upon the passage of inverse current, of an electropositive electrode element made from metallic tungsten; said electrode elements being operatively disposed in adjacent relation so as to provide a relatively permanent asymmetric conducting film.

3. In dry surface contact rectifying devices and the like, the combination, with an electronegative electrode element comprising a metallic oxide, of an electropositive electrode element comprising a metallic element of the chromium group, having a film-coating of one of its oxides; said electrode elements being operatively disposed in adjacent relation so as to provide a relatively permanent asymmetric conducting film.

4. In dry surface contact rectifying devices and the like, the combination, with an electronegative electrode element comprising a metallic oxide, of an electropositive electrode element made from metallic tungsten and formed with a film coating of an oxide thereof; said electrode elements being operatively disposed in adjacent relation so as to provide a relatively permanent asymmetric conducting film.

5. In dry surface contact rectifying devices and the like, the combination with an electronegative electrode element made of an oxide of vanadium, of an electropositive electrode element comprising an element of the chromium group; said electrode elements being operatively disposed in adjacent relation so as to provide a relatively permanent asymmetric conducting film.

6. In dry surface contact rectifying devices and the like, the combination with an electronegative electrode element made of an oxide of vanadium, of an electropositive electrode element comprising a body of metal from the chromium group formed to have a film coating of one of its oxides; said electrode elements being operatively disposed in adjacent relation so as to provide a relatively permanent asymmetric conducting film.

7. In dry surface contact rectifying devices and the like, the combination, with an electronegative electrode element made of vanadic pentoxide, of an electropositive electrode element made from metallic tungsten; said electrode elements being opertively disposed in adjacent relation so as to provide a relatively permanent asymmetric conducting film.

8. In dry surface contact rectifying devices and the like, the combination with an electronegative electrode element made of vanadic pentoxide, of an electropositive electrode element made from metallic tungsten and formed to have a film coating of an oxide thereof; said electrode elements being operatively disposed in adjacent relation so as to provide a relatively permanent asymmetric conducting film.

9. A current rectifying cell of the type described, having an electrode of vanadic pentoxide.

10. A current rectifying cell of the type described, having a pair of electrodes, one of which is tungsten and the other of which is vanadic pentoxide.

11. A current rectifying cell of the type described, having a pair of electrodes, one of which is a metal of the chromium group and the other of which is vanadic pentoxide.

12. A current rectifier of the type described, having an electrode of tungsten having a film coating of an oxide thereof, and another electrode composed of vanadic pentoxide.

Signed at New York, in the county of New York and State of New York this 26th day of January, A. D. 1925.

SAMUEL RUBEN.